US011119558B2

(12) United States Patent
Huang (10) Patent No.: US 11,119,558 B2
(45) Date of Patent: Sep. 14, 2021

(54) METHOD AND SYSTEM FOR DEVICE ACTIVATION (71) Applicant: Sony Mobile Communications Inc., Tokyo (JP)

(72) Inventor: Sangxia Huang, Lund (SE)

(73) Assignee: Sony Group Corporation, Tokyo (JP)

( * ) Notice: Subject to any disclaimer, the term of this patent is extended or adjusted under 35 U.S.C. 154(b) by 132 days.

(21) Appl. No.: 16/522,598

(22) Filed: Jul. 25, 2019

(65) Prior Publication Data
US 2020/0133373 A1 Apr. 30, 2020

(30) Foreign Application Priority Data
Oct. 29, 2018 (SE) .................... 1830309-9

(51) Int. Cl.
G06F 1/32 (2019.01)
G06F 3/01 (2006.01)
G01P 1/00 (2006.01)
G06F 1/3231 (2019.01)
G01P 15/00 (2006.01)
G06F 1/3287 (2019.01)
G06F 1/16 (2006.01)

(52) U.S. Cl.
CPC ............ *G06F 1/3231* (2013.01); *G01P 15/00* (2013.01); *G06F 1/3287* (2013.01); *G06F 3/017* (2013.01)

(58) Field of Classification Search
CPC ...... G06F 1/3231; G06F 1/3287; G06F 3/017; G06F 1/1694; G01P 15/00; Y02D 10/00
USPC ........................................ 713/300, 320, 323
See application file for complete search history.

(56) References Cited

U.S. PATENT DOCUMENTS

| | | | |
|---|---|---|---|
| 2002/0090117 A1* | 7/2002 | Kramer | G06K 9/0002 382/124 |
| 2010/0085203 A1 | 4/2010 | Kahn et al. | |
| 2010/0235667 A1 | 9/2010 | Mucignat | |
| 2011/0223974 A1* | 9/2011 | Agevik | G06F 1/1694 455/566 |

(Continued)

FOREIGN PATENT DOCUMENTS

| | | |
|---|---|---|
| EP | 2485542 A2 | 8/2012 |
| EP | 3067784 A1 | 9/2016 |

(Continued)

OTHER PUBLICATIONS

The Extended European Search Report relating to corresponding EP application No. 19189664.6 dated Feb. 17, 2020.

(Continued)

Primary Examiner — Michael J Brown
(74) Attorney, Agent, or Firm — Tucker Ellis LLP (57) ABSTRACT An electronic device is configured to analyze movement data generated by a sensor (e.g., an accelerometer assembly) in the electronic device to determine if the electronic device should be activated from a reduced power state. A control circuit in the electronic device can compare the movement data to a predetermined movement pattern to determine whether the movement should be ignored, or if the movement is consistent with a user shaking the electronic device to activate the electronic device. As a result of this approach, erroneous activation of the electronic device is avoided, thereby preventing the electronic device from needlessly depleting its battery before deployment by the end user.

20 Claims, 3 Drawing Sheets (56) References Cited

U.S. PATENT DOCUMENTS

2015/0095678 A1    4/2015  Nachman et al.
2015/0291127 A1*  10/2015  Ghabra .............. G07C 9/00309
                                                      701/2
2016/0018872 A1*   1/2016  Tu ......................... G06F 3/0346
                                                      345/173
2016/0202998 A1    7/2016  Lay

FOREIGN PATENT DOCUMENTS

GB            251550 A    12/2014
WO     2018143871 A1    8/2018

OTHER PUBLICATIONS

Swedish Search Report and Office Action from corresponding Swedish Patent Application No. 1830309-9, dated May 3, 2019, 8 pages.

\* cited by examiner

METHOD AND SYSTEM FOR DEVICE ACTIVATION

RELATED APPLICATION DATA

This application claims the benefit of Swedish Patent Application No. 1830309-9, filed Oct. 29, 2018, the disclosure of which is incorporated herein by reference in its entirety.

TECHNICAL FIELD OF THE INVENTION

The technology of the present disclosure relates generally to internet of things devices and, more particularly, to a method of analyzing a pattern of movement of a device to determine whether to activate the device from a reduced power state.

BACKGROUND

Internet of things (IoT) devices allow for network connectivity in non-standard networked devices. These IoT devices are often sealed and/or ruggedized and include internal electronics with minimal or no user interface. When these devices are shipped to an end user, it is beneficial to ship the devices in a reduced power state to conserve battery life. For example, the IoT devices may be shipped in a low power state where the device's controller and/or network interface are deactivated.

But activation of IoT devices has become an issue. Due to the lack of a user interface, the end user has limited options for "waking up" or activating the IoT device from its low power state. One option is to configure the IoT device to activate based on any detected movement measured by an accelerometer contained within the device. However, when using the accelerometer alone to make a decision whether to wake up the device, only simple threshold criteria is possible. This approach may erroneously activate the device during transit, causing the device's battery to be unnecessarily depleted while in transit.

SUMMARY

The disclosed approach includes analyzing movement data generated by a sensor (e.g., an accelerometer assembly) in the IoT device to determine if the IoT device should be activated from a reduced power state. A control circuit in the IoT device can compare the movement data to a predetermined movement pattern to determine whether the movement should be ignored, or if the movement is consistent with a user shaking the device to activate the device. As a result of this approach, erroneous activation of the IoT device is avoided, thereby preventing the IoT device from needlessly depleting its battery before deployment by the end user.

According to aspects of the disclosure, a method of activating an electronic device includes obtaining movement data indicative of movement of the electronic device; determining whether at least a portion of the movement data satisfies a predetermined activation criteria comprising one or more predetermined motion patterns of the electronic device; and activating a power state based on determining whether the portion of the movement data satisfies the predetermined activation criteria.

According to one embodiment of the method, activating the power state includes reverting to a first power state in response to determining that the portion of the movement data does not satisfy the predetermined activation criteria, and reverting to the first power state includes deactivating a control circuit.

According to one embodiment of the method, the method further includes disabling activation of the control circuit for a period of time in response to one or more consecutive determinations that the portion of the movement data does not satisfy the predetermined activation criteria.

According to one embodiment of the method, activating the power state includes activating a third power state in response to determining that the portion of the movement data satisfies the predetermined activation criteria, and activating the third power state includes activating a communication interface.

According to one embodiment of the method, the method further includes transmitting the movement data to a host computing system during the third power state.

According to one embodiment of the method, the method further includes activating a second power state prior to obtaining the movement data, and activating the second power state includes activating a control circuit.

According to one embodiment of the method, obtaining the movement data includes receiving the movement data from a buffer that is part of a sensor that generates the movement data.

According to one embodiment of the method, the activation criteria includes at least one of a magnitude of acceleration, a change in acceleration, a number of changes in acceleration, or a predetermined pattern of acceleration changes.

According to one embodiment of the method, the predetermined motion pattern is representative of a user shaking the electronic device.

According to one embodiment of the method, the activation criteria includes a predetermined pattern of alternating acceleration.

According to one embodiment of the method, determining whether the movement data satisfies the predetermined activation criteria includes applying a statistical model to compare the movement data to the predetermined activation criteria.

According to one embodiment of the method, the predetermined activation criteria is based off of a trained model.

According to one embodiment of the method, the movement data is representative of movement of the electronic device over a fixed period of time.

According to one embodiment of the method, the movement data is acceleration data.

According to aspects of the disclosure, an electronic device includes a communications interface, a sensor configured to generate movement data indicative of movement of the electronic device and a control circuit configured to obtain the movement data from the sensor. The control circuit is further configured to determine whether at least a portion of the movement data satisfies a predetermined activation criteria comprising a predetermined motion pattern of the electronic device. The control circuit is further configured to activate a power state based on determining whether the portion of the movement data satisfies the predetermined activation criteria.

According to one embodiment of the electronic device, the control circuit is configured to activate a first power state in response to determining that the portion of the movement data does not satisfy the predetermined activation criteria, and activating the first power state includes deactivating the control circuit.

According to one embodiment of the electronic device, the control circuit is further configured to disable activation of the control circuit for a period of time in response to one or more consecutive determinations that the portion of the movement data does not satisfy the predetermined activation criteria.

According to one embodiment of the electronic device, the control circuit is configured to activate a third power state in response to determining that the portion of the movement data satisfies the predetermined activation criteria.

According to one embodiment of the electronic device, activating the third power state includes activating the communications interface.

According to one embodiment of the electronic device, the control circuit is further configured to transmit the movement data, using the communication interface, to a host computing system during the third power state.

According to one embodiment of the electronic device, the control circuit is further configured to activate a second power state prior to obtaining the movement data from the sensor, wherein activating the second power state includes activating the control circuit.

According to one embodiment of the electronic device, the control circuit is configured to activate the second power state in response to the movement data exceeding a predetermined threshold.

According to one embodiment of the electronic device, the sensor comprises a buffer, and the control circuit is configured to obtain the movement data from the buffer.

According to one embodiment of the electronic device, the sensor is further configured to overwrite the buffer when a buffer storage limit is reached.

According to one embodiment of the electronic device, the activation criteria is at least one of a magnitude of acceleration, a change in acceleration, a number of changes in acceleration, or a predetermined pattern of acceleration changes.

According to one embodiment of the electronic device, the predetermined motion pattern is representative of a user shaking the electronic device.

According to one embodiment of the electronic device, the activation criteria includes a predetermined pattern of alternating acceleration.

According to one embodiment of the electronic device, the control circuit is configured to determine whether the movement data satisfies a predetermined activation criteria by applying a statistical model to compare the movement data to the predetermined activation criteria.

According to one embodiment of the electronic device, the predetermined activation criteria is based off a trained model.

According to one embodiment of the electronic device, the movement data is representative of movement of the electronic device over a fixed period of time.

According to one embodiment of the electronic device, the sensor is an accelerometer.

According to aspects of the disclosure, a non-transitory computer-readable storage medium having stored thereon computer-executable instructions that, when executed, configure a control circuit to obtain movement data indicative of movement of an electronic device; determine whether the movement data satisfies a predetermined activation criteria comprising a predetermined motion pattern of the electronic device; deactivate the control circuit in response to determining that the movement data does not correspond to the predetermined activation criteria; and activate a communication interface in response to determining that the movement data corresponds to the predetermined activation criteria.

According to one embodiment of the non-transitory computer-readable storage medium, the computer-executable instructions further configure the control circuit to transmit the movement data to a host computing system.

According to one embodiment of the non-transitory computer-readable storage medium, the computer-executable instructions further configure the control circuit to disable activation of the control circuit for a period of time in response to one or more consecutive determinations that the movement data does not satisfy the predetermined activation criteria.

According to one embodiment of the non-transitory computer-readable storage medium, the activation criteria is at least one of a magnitude of acceleration, a change in acceleration, a number of changes in acceleration, or a predetermined pattern of acceleration changes.

According to one embodiment of the non-transitory computer-readable storage medium, the predetermined motion pattern is representative of a user shaking the electronic device.

According to one embodiment of the non-transitory computer-readable storage medium, the activation criteria includes a predetermined pattern of alternating acceleration.

According to one embodiment of the non-transitory computer-readable storage medium, the computer-executable instructions configure the control circuit to determine whether the movement data satisfies the predetermined activation criteria by applying a statistical model to compare the movement data to the predetermined activation criteria.

According to one embodiment of the non-transitory computer-readable storage medium, the predetermined activation criteria is based off a trained model.

According to one embodiment of the non-transitory computer-readable storage medium, the movement data is representative of movement of the electronic device over a fixed period of time.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of internet of things (IoT) devices, and systems and methods that determine whether to activate the IoT device.

Figure 1:
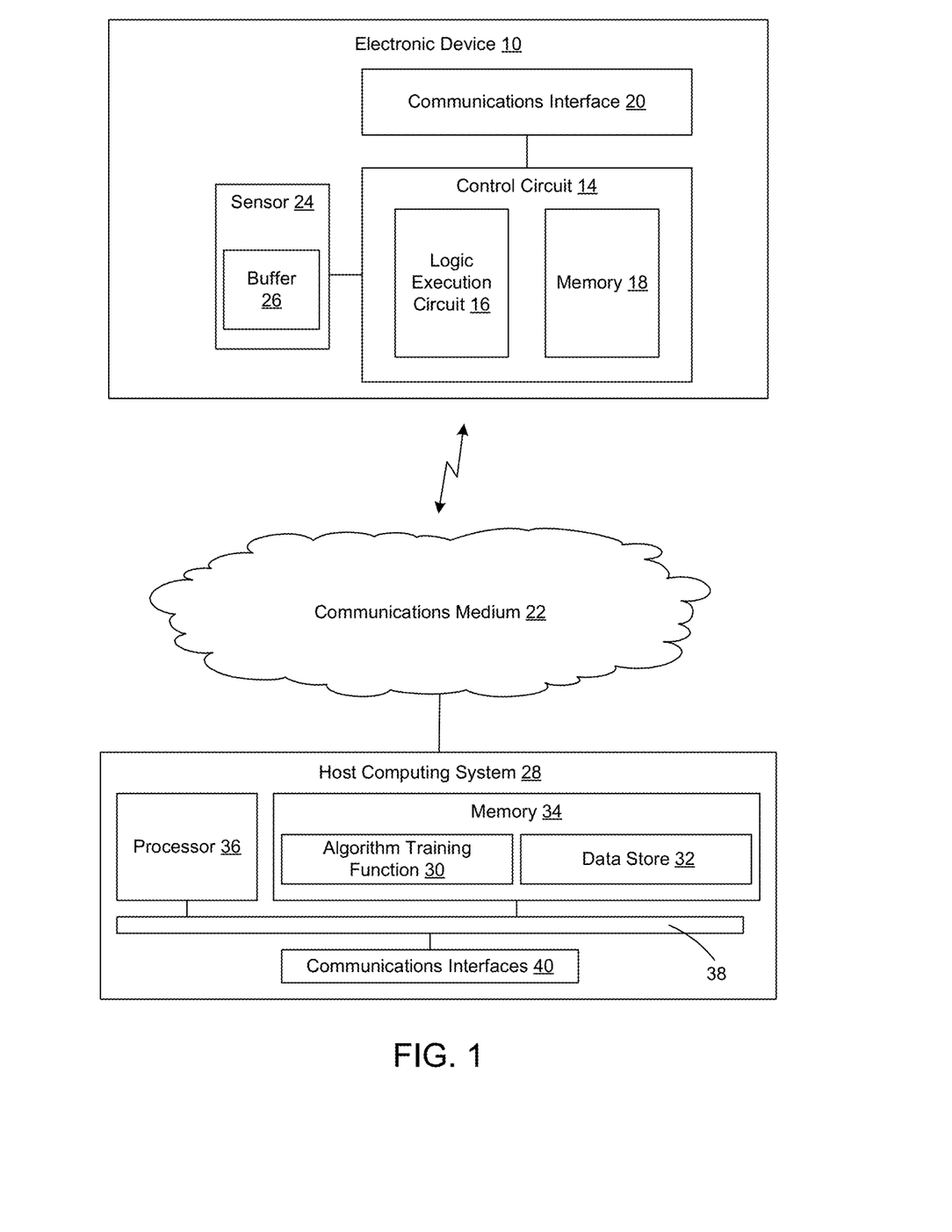
FIG. 1 is a schematic diagram showing the electronic device, the electronic device is shown as part of a system.

With additional reference to FIG. 1, illustrated is an exemplary system for implementing the disclosed techniques. It will be appreciated that the illustrated system is representative and other systems may be used to implement the disclosed techniques.

The system includes the electronic device 10. The electronic device 10 may be user devices, also known as user equipment or UEs, or machine-type devices. Exemplary electronic devices 10 include, but are not limited to internet-of-things devices (e.g. a trackable tag, or a wearable device), a device that uses machine-type communications, machine-to-machine (M2M) communications or device-to-device (D2D) communication (e.g., a sensor, a machine controller, an appliance, etc.), a mobile radiotelephones (such as "smartphones"), tablet computing devices, computers, a camera, a media player, or any other device that conducts wireless communications. The electronic device 10 is configured to carry out associated logical functions that are described herein. The electronic device 10 includes a control circuit 14 that is responsible for overall operation of the electronic device 10. The electronic device 10 may include a logic execution circuit 16, such as a processor, that executes code to carry out various functions of the electronic device 10. Logical functions and/or hardware of the electronic device 10 may be implemented in other manners depending on the nature and configuration of the electronic device 10. Therefore, the illustrated and described approaches are just examples and other approaches may be used including, but not limited to, the control circuit 14 being implemented as, or including, hardware (e.g., a microprocessor, microcontroller, central processing unit (CPU), printed circuit board, etc.) or a combination of hardware and software (e.g., a system-on-chip (SoC), an application-specific integrated circuit (ASIC), field programmable gate array (FPGA), etc.).

The code executed by the logic execution circuit 16 and data stored by the electronic device 10 may be stored by a memory 18. The stored data may include, but is not limited to, data associated with the device activation functions of the electronic device 10.

The memory 18 may be, for example, one or more of a buffer, a flash memory, a hard drive, a removable media, a volatile memory, a non-volatile memory, a random access memory (RAM), or other suitable device. In a typical arrangement, the memory 18 includes a non-volatile (persistent) memory for long term data storage and a volatile memory that functions as system memory for the control circuit 14. The memory 18 is considered a non-transitory computer readable medium.

In some embodiments, the electronic device 10 includes a communications interface 20 (e.g., communications circuitry) that enables the electronic device 10 to transmit messages in broadcast format (e.g., without the establishment of a session with another device and/or without the expectation of a return response) or to establish a wireless communication connection with another device over a communications medium 22 and send messages via the wireless communication connection. In the exemplary embodiment, the communications interface 20 includes a radio circuit. The radio circuit includes one or more radio frequency transceivers and at least one antenna assembly. Wired communications interfaces also may be present. In the embodiment where the communications interface 20 is operational to establish a wireless communication connection, the communications interface 20 and communications medium 22 may include coordinating transceivers. Exemplary transceivers include, but are not limited to, a cellular radio, a WiFi radio, a Bluetooth radio, a Bluetooth low energy (BLE) radio, or any other appropriate radio frequency transceiver.

Also, an appropriate protocol may be followed by the communications interface 20 and/or the communications medium 22, such as a 3G, 4G or 5G protocol, an Internet or Things (IoT) protocol, a machine to machine (M2M) protocol, a WiFi protocol, a Bluetooth or BLE protocol, etc.

The electronic device 10 has a sensor 24 configured to generate data indicative of movement of the electronic device 10. Certain embodiments of the sensor 24 can generate data indicative of movement of the electronic device 10 in three dimensions. In one embodiment, the sensor 24 is an accelerometer assembly. Another embodiment of the orientation sensor 24 is a gyro assembly. Sensor 24 can include its own buffer 26 memory to store the movement data. The buffer 26 can be a physical memory such as a flash memory, a hard drive, a removable media, a volatile memory, a non-volatile memory, a random access memory (RAM), or other suitable device. In some embodiments, the buffer 26 is a standalone memory that is part of the sensor 24. In other embodiments, the buffer 26 can be incorporated into a portion of the memory 18.

It should be appreciated that the electronic device 10 may include other sensors or components. The additional sensor or sensors may be, for example, a thermometer, a heart rate monitor, a vibration sensor, a camera, a microphone, a GPS transceiver, or any other appropriate device. Although not shown, the electronic device 10 may further include a power supply unit that includes a battery for delivering operational power to the other components of the electronic device 10. The battery may be rechargeable.

Data may be transmitted from the electronic device 10 to a host computing system 28, such as a server, a personal computer, a portable user equipment (e.g., a smartphone), etc. The host computing system 28 may be implemented as a computer-based system that is capable of executing computer applications (e.g., software programs). An exemplary application includes an algorithm training function 30. The algorithm training function 30, when executed, carries out functions of the host computing system 28 that are described herein. The algorithm training function 30, any other applications and an operating system executed by the host computing system 28, and a data store 32 may be stored on a non-transitory computer readable medium, such as a memory 34. The data store 32 may be used to store various information sets used to carry out the functions described in this disclosure. The memory 34 may be, for example, a magnetic, optical or electronic storage device (e.g., hard disk, optical disk, flash memory, etc.), and may comprise several devices, including volatile and non-volatile memory components. Accordingly, the memory 34 may include, for example, random access memory (RAM) for acting as system memory, read-only memory (ROM), solid-state drives, hard disks, optical disks, tapes, flash devices and/or other memory components, plus associated drives, players and/or readers for the memory devices.

To execute logical operations, the host computing system 28 may include one or more processors 36 used to execute instructions that carry out logic routines. The processor 36 and the memory 34 may be coupled using a local interface 38. The local interface 38 may be, for example, a data bus with accompanying control bus, a network, or other subsystem.

The host computing system 28 may have various input/output (I/O) interfaces for operatively connecting to various peripheral devices. The host computing system 28 also may have one or more communications interfaces 40. The communications interface 40 may include for example, a modem and/or a network interface card. The communications interface 40 enables the host computing system 28 to send and receive data to and from other computing devices via the communications medium 22. Also, the communications interface 40 enables the host computing system 28 to receive messages and data from the electronic device 10 either directly or by way of the communications medium 22. The communications medium 22 may be any network platform and may include multiple network platforms. Exemplary network platforms include, but are not limited to, a WiFi network, a cellular network, etc.

Figure 2:
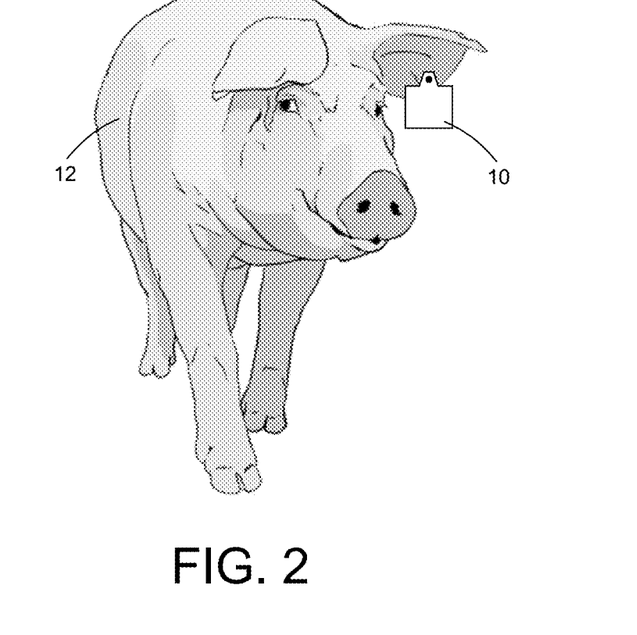
FIG. 2 schematically shows an exemplary electronic device attached to a representative object.

FIG. 2 shows an exemplary electronic device 10 attached to an object 12. In the illustrated embodiment, the electronic device 10 is a tag and the object 12 is an animal maintained as livestock with a number of other similar animals. The animal of the illustrated embodiment is a pig. It will be understood that the tag may be used with other types of animals or with other types of objects, which need not be living.

Figure 3:
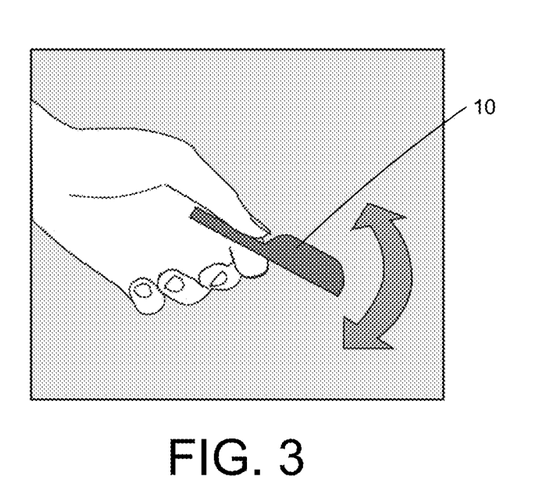
FIG. 3 schematically shows a user activating an exemplary electronic device.

In the exemplary context shown in FIG. 2, the electronic device 10 is attached to the pig with a piercing through an ear of the pig. Other attachment mechanisms may be employed and the attachment mechanism may be changed depending on the type of object 12 to which the electronic device 10 is attached. For instance, in the case of a bird, the electronic device 10 may be pierced to a wing of the bird. Alternatively, the electronic device 10 may be attached using a band placed around a leg of the animal. In the case of non-living objects, the tag may be attached with adhesive, a strap, a threaded fastener, or any other appropriate connector. The tag in this example can be used to track a location or movement of an animal or an object. Electronic devices 10 such as the tag may be shipped to an end user of the electronic device 10. In order to conserve battery life, the electronic device 10 is placed into a low power state while in transit, prior to being placed into service by an end user. Upon receiving the electronic device 10, the end user may be instructed to shake the electronic device 10 in a certain pattern to activate the electronic device 10, as shown in FIG. 3.

Figure 4:
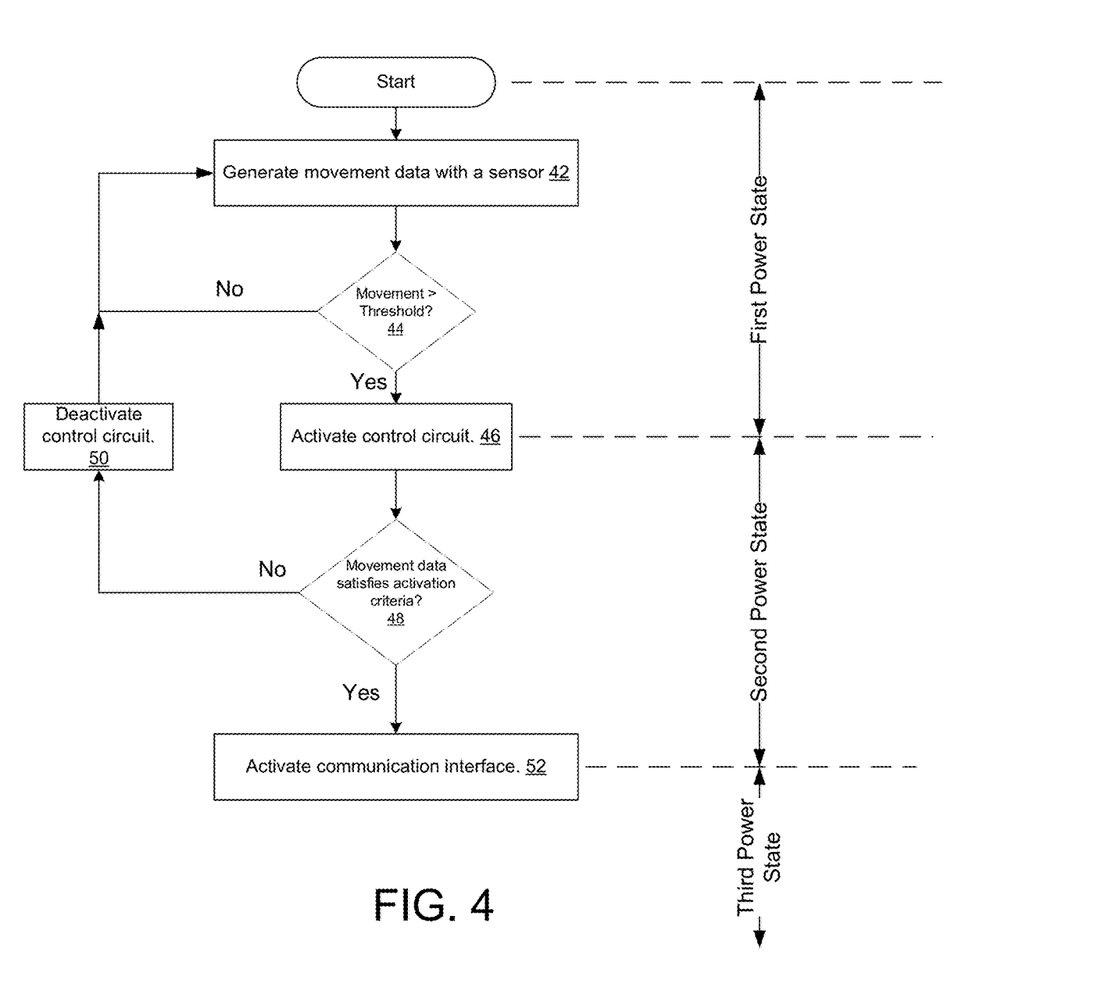
FIG. 4 is a flow diagram of a representative method of analyzing the movement data.

Turning now to FIG. 4, shown is an exemplary flow diagram representing steps that may be carried out by the electronic device 10 to determine whether to activate the electronic device 10 or revert to a low power state. FIG. 4 illustrates an exemplary process flow and, although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 42. At block 42, the electronic device 10 is in a first power state, where the communication interface 20 is deactivated, and the control circuit 14 is either deactivated or placed into a low power state. In this first power state, the electronic device 10 is conserving battery charge by only providing power to the sensor 24. In block 42, the sensor 24 is used to generate data indicative of movement of the electronic device 10. In one embodiment, the sensor 24 is an accelerometer assembly that outputs movement data in the form of raw accelerometer signals for up to three mutually orthogonal axes (e.g., an x-axis, a y-axis and a z-axis). In another embodiment, the sensor is an accelerometer assembly that outputs movement data in the form of raw accelerometer signals measuring only the amplitude of acceleration. As the sensor 24 generates the movement data, the movement data can be stored in the buffer 26. The buffer 26 can be configured to store a set amount of movement data corresponding to a fixed period of time. By way of example and not limitation, the buffer 26 may store movement data only for the previous three seconds. The sensor 24 can continuously overwrite the previous movement data on the buffer 26 so that old movement data (e.g., movement data outside of the fixed time period) is overwritten with new movement data.

At block 44, the movement data is compared to a threshold value. In one embodiment, the sensor 24 includes a control circuit to perform this comparison. In another embodiment, the control circuit 14 can perform this comparison. For example, the threshold value can be an instantaneous magnitude of acceleration, or an average acceleration over a period of time. If the movement data does not exceed the threshold value, the electronic device 10 will remain in the first power state. Continuing in the first power state, the sensor 24 will continue to generate movement data, and store the movement data in the buffer 26. If the movement data exceeds the threshold value, the control circuit 14 is activated at block 46, or in embodiments where the control circuit 14 operates in a low power state during the first power state, the control circuit 14 is fully activated. Upon activation of the control circuit 14, the electronic device enters a second power state.

During the second power state and upon the control circuit's 14 activation, the control circuit 14 receives the movement data stored in the buffer 26. At block 48, the control circuit 14 analyzes the movement data to determine whether the movement data satisfies predetermined activation criteria. The predetermined activation criteria can include one or more predetermined motion patterns of the electronic device 10. For example, the control circuit 14 can analyze the movement data to determine whether the movement data corresponds with a motion pattern representative of a user shaking the electronic device 10. The movement data analysis can involve comparing the movement data to the activation criteria using algorithms based on at least one of a frequency of changes in acceleration, a magnitude of acceleration, a number of changes in acceleration, or a specific pattern of acceleration changes such as a pattern of slow shakes alternated with fast shakes.

In certain embodiments, algorithms used to compare the movement data with the activation criteria's movement pattern can be adapted by using a trained model. The trained model can involve collecting a plurality of sample movement data and using machine learning techniques to train a system to recognize positive motion patterns that correspond with a user shaking the electronic device 10 and distinguish such positive motion patterns from erroneous negative motion patterns that are to be ignored. A positive motion pattern can be required to have, for example, a specific pattern of changes in acceleration, a specific frequency of changes in acceleration, a specific frequency of changes in acceleration over a set time period, among others. Statistical models can be used to determine a confidence level that the movement data corresponds to a user shaking the electronic device 10. In one embodiment, the control circuit 14 analyzes the movement data using a comparison algorithm to determine a percentage confidence level that the movement data represents a positive motion pattern. By way of example and not limitation, the control circuit 14 receives the movement data from the buffer 26 and analyzes the movement data using an algorithm. The control circuit 14 can determine by processing the movement data with the algorithm that the movement data represents a positive motion pattern with a 90% confidence level. If the 90% confidence level exceeds a confidence level threshold, then this movement data is considered a match to a positive motion pattern and the communication interface 20 is activated.

In certain embodiments, a neural network can be developed. The neural network can be trained by sample data classified either as a positive motion pattern (e.g. a movement waveform that represents a user shaking the electronic device 10), or a negative motion pattern (e.g. a waveform that does not represent a user shaking the electronic device 10). The control circuit 14 can process the movement data using the learned neural network to classify the movement data as a positive motion pattern that satisfies the activation criteria, or a negative motion pattern that does not satisfy the activation criteria. In certain embodiments, a target waveform can be developed using a trained model. The target waveform is representative of a waveform derived from movement data corresponding to a user shaking the electronic device 10. The control circuit 14 can process the movement data by comparing the movement data waveform to the target waveform to derive an error value based on differences between the movement data waveform and the target waveform. The control circuit 14 can then compare the error value of the movement data to an error value threshold. If the error value of the movement data exceeds the error value threshold, then the activation criteria is not satisfied. If the error value of the movement data is less than the error threshold, then the activation criteria is satisfied.

In certain embodiments, the control circuit 14 can compare the movement data waveforms to multiple target waveforms representing different motion patterns. In these embodiments, the movement data waveform can be compared to each of the target waveforms. In this situation, the error value used to compare with the error value threshold can be the lowest error value of each of the error values as calculated with respect to each of the target waveforms. In this manner, the control circuit 14 can account for different motion patterns that may represent a user shaking the electronic device 10 to activate the electronic device 10.

If the movement data does not satisfy the activation criteria, the electronic device 10 reverts back to the first power state when the control circuit 14 is deactivated or placed into a low power state at block 50, and only the sensor 24 is drawing power. In some embodiments, the control circuit 14 can be disabled for a period of time in response to one or more consecutive determinations that the movement data does not satisfy the predetermined activation criteria. For example, the control circuit 14 can be configured to disable itself after a set number of times of determining that the movement data does not satisfy the activation criteria. After disabling itself, the control circuit 14 will not activate for a set amount of time, even if the movement data from the sensor 24 satisfies the threshold value in the first power state. This feature can prevent repetitive control circuit 14 activations based on movement data from erroneous movement of the electronic device 10, such as from handling during shipment or travelling over a bumpy road.

On the other hand, if the movement data satisfies the activation criteria in block 48, the communication interface 20 is activated at block 52. At block 52, the communication interface 20 is activated and the electronic device enters a third power state where the sensor 24, the control circuit 14, and the communication interface 20 are all active. The electronic device 10 is considered to be activated while in the third power state. Once the communication interface 20 is active, the electronic device 10 can establish communication with a host computer system 28. Once communications are established, the electronic device 10 can perform measurements and communicate data according to its programmed instructions. Further, the electronic device 10 can also report activation information pertaining to the electronic device 10 activation process to the host computing system 28. The activation information can include information such as the movement data, a timestamp of activation time, present GPS coordinates, or any other data pertaining to the electronic device's 10 activation or present condition upon activation.

After being communicated to the host computing system, the algorithm training function 30 can use the activation information as a data sample to further train the model used in the development of the algorithm used by electronic devices 10 to analyze movement data. Data included in the activation information can be used to verify if the movement data truly was representative of a user shaking the electronic device 10. For example, a location of the electronic device at activation (e.g. as determined by GPS coordinates at the time of activation) can be compared to an expected end user location to determine if the electronic device 10 was shaken by the user or if the activation was due to a false positive. If the activation location is at an expected end user location, the movement data can be categorized as a positive motion pattern and used as a sample movement data to further train the algorithm or neural network. In this manner, the algorithm, neural network, and/or the target waveform can be continuously improved thereby improving the accuracy of the control circuit 14 in correctly identifying positive motion patterns that satisfy the predetermined activation criteria. The improved algorithms can be employed on subsequent electronic devices 10.

Although certain embodiments have been shown and described, it is understood that equivalents and modifications falling within the scope of the appended claims will occur to others who are skilled in the art upon the reading and understanding of this specification.

What is claimed is:

1. A method of activating an electronic device comprising a sensor and a control circuit, the method comprising:
   obtaining, in the sensor, movement data indicative of movement of the electronic device;
   comparing, in the sensor, at least a portion of the movement data with a predetermined threshold value;
   providing, by the sensor, and responsive to said at least a portion of the movement data exceeding the predetermined threshold value, said movement data to the control circuit from the sensor;
   determining, in the control circuit, whether at least a portion of the movement data satisfies a predetermined activation criteria comprising one or more predetermined motion patterns of the electronic device;
   activating, by the control circuit, a power state based on determining whether the portion of the movement data satisfies the predetermined activation criteria; and
   disabling activation of the control circuit for a period of time in response to one or more consecutive determinations that the portion of the movement data does not satisfy the predetermined activation criteria.

2. The method of claim 1, wherein activating the power state comprises reverting to a first power state in response to determining that the portion of the movement data does not satisfy the predetermined activation criteria, wherein reverting to the first power state includes deactivating the control circuit.

3. The method of claim 1, wherein activating the power state comprises activating a third power state in response to determining that the portion of the movement data satisfies the predetermined activation criteria, wherein activating the third power state includes activating a communication interface.

4. The method of claim 3, further comprising:
transmitting the movement data to a host computing system during the third power state.

5. The method of claim 1, further comprising:
activating a second power state prior to obtaining the movement data in the control circuit, wherein activating the second power state includes activating the control circuit.

6. The method of claim 1, wherein obtaining the movement data in the control circuit includes receiving the movement data from a buffer that is part of the sensor that generates the movement data.

7. The method of claim 1, wherein the activation criteria includes at least one of a magnitude of acceleration, a change in acceleration, a number of changes in acceleration, or a predetermined pattern of acceleration changes.

8. The method of claim 1, wherein the predetermined motion pattern is representative of a user shaking the electronic device.

9. The method of claim 1, wherein the activation criteria includes a predetermined pattern of alternating acceleration.

10. The method of claim 1, wherein determining whether the movement data satisfies the predetermined activation criteria includes applying a statistical model to compare the movement data to the predetermined activation criteria.

11. The method of claim 1, wherein the predetermined activation criteria is based off of a target waveform developed using a trained model, which includes collecting a plurality of sample movement data and using machine learning to train a system to recognize positive motion patterns and distinguish such positive motion patterns from erroneous negative motion patterns that are to be ignored.

12. The method of claim 1, wherein the movement data is representative of movement of the electronic device over a fixed period of time.

13. The method of claim 1, wherein the movement data is acceleration data.

14. An electronic device comprising:
a communications interface;
a sensor configured to:
generate movement data indicative of movement of the electronic device; and
compare at least a portion of the movement data with a predetermined threshold value; and
a control circuit configured to:
obtain the movement data from the sensor, responsive to said at least portion of the movement data exceeding the predetermined threshold value;
determine whether at least a portion of the movement data satisfies a predetermined activation criteria comprising a predetermined motion pattern of the electronic device;
activate a power state based on determining whether the portion of the movement data satisfies the predetermined activation criteria; and
disable activation of the control circuit for a period of time in response to one or more consecutive determinations that the portion of the movement data does not satisfy the predetermined activation criteria.

15. The electronic device of claim 14, wherein the control circuit is configured to activate a first power state in response to determining that the portion of the movement data does not satisfy the predetermined activation criteria, wherein activating the first power state includes deactivating the control circuit.

16. The electronic device of claim 14, wherein the control circuit is configured to activate a third power state in response to determining that the portion of the movement data satisfies the predetermined activation criteria, and activating the third power state includes activating the communications interface.

17. The electronic device of claim 16, wherein the control circuit is further configured to transmit the movement data, using the communication interface, to a host computing system during the third power state.

18. The electronic device of claim 14, wherein the activation criteria is at least one of a magnitude of acceleration, a change in acceleration, a number of changes in acceleration, or a predetermined pattern of acceleration changes.

19. The electronic device of claim 14, wherein the predetermined motion pattern is representative of a user shaking the electronic device.

20. The electronic device of claim 14, wherein the predetermined activation criteria is based off of a target waveform developed using a trained model configured to collect a plurality of sample movement data and use machine learning to train a system to recognize positive motion patterns and distinguish such positive motion patterns from erroneous negative motion patterns that are to be ignored.

* * * * *